United States Patent [19]

Johnson et al.

[11] Patent Number: 5,485,136
[45] Date of Patent: Jan. 16, 1996

[54] LOAD BREAK DISCONNECTING DEVICE WITH SOLID ARC SUPPRESSION MEANS

[75] Inventors: Stephen P. Johnson, Olean, N.Y.; Stephen P. Hassler, Muskego; John Lapp, Franklin, both of Wis.

[73] Assignee: Cooper Industries, Inc., Houston, Tex.

[21] Appl. No.: 41,954

[22] Filed: Apr. 2, 1993

Related U.S. Application Data

[63] Continuation-in-part of Ser. No. 946,961, Sep. 17, 1992, Pat. No. 5,274,349.

[51] Int. Cl.$^6$ .................................................. H01H 71/10
[52] U.S. Cl. ............................................. 337/168; 337/273
[58] Field of Search .................................. 337/150–181, 337/273

[56] References Cited

U.S. PATENT DOCUMENTS

| | | | |
|---|---|---|---|
| 3,235,696 | 2/1966 | Mikulecky | 200/149 |
| 3,437,971 | 4/1969 | Mikulecky | 337/158 |
| 3,611,240 | 10/1971 | Mikulecky | 337/169 |
| 3,774,137 | 9/1972 | Carothers | 337/174 |
| 3,825,871 | 11/1973 | Blewitt | 337/171 |
| 3,827,010 | 7/1974 | Cameron et al. | 337/168 |
| 3,849,754 | 11/1974 | Blewitt | 337/159 |
| 3,863,187 | 1/1975 | Mahieu et al. | 337/162 |
| 4,011,537 | 3/1977 | Jackson, Jr. et al. | 337/171 |
| 4,114,128 | 9/1978 | Cameron | 337/162 |
| 4,184,138 | 1/1980 | Beard et al. | 337/168 |
| 4,225,840 | 9/1980 | Jacobs, Jr. | 337/273 |
| 4,540,968 | 9/1985 | Kato et al. | 337/31 |
| 4,542,363 | 9/1985 | Kato et al. | 337/31 |

Primary Examiner—Lincoln Donovan
Attorney, Agent, or Firm—Conley, Rose & Tayon

[57] ABSTRACT

An improved load break disconnecting device is disclosed, comprising a conductive portion having a non-gassing fuse, a fuse cartridge having first and second ends and enclosing said fuse, a conducting hinge assembly and conducting stationary contact means, and a non-conducting arc extinguishing sleeve with latch means for latching the sleeve in a non-covering position until the switch is closed and biasing means for snapping the sleeve into an arc-extinguishing, covering position when the switch is opened.

20 Claims, 4 Drawing Sheets

LOAD BREAK DISCONNECTING DEVICE WITH SOLID ARC SUPPRESSION MEANS

RELATED APPLICATION

This application is a continuation-in-part of U.S. patent application Ser. No. 07/946,961 filed Sep. 17, 1992, now U.S. Pat. No. 5,274,349, and entitled "Current Limiting Fuse and Dropout Fuseholder for Interchangeable Cutout Mounting".

BACKGROUND OF THE INVENTION

This invention relates to load break disconnecting switches which are used with transformers and more particularly with housed, ground-level mounted transformers employed with underground distributions systems.

Electrical distribution systems are typically buried underground for reasons of aesthetics, safety and system longevity. The step down distribution transformers employed in such distribution systems must be accessible, however, so that they are generally mounted on a ground-level concrete pad and are enclosed within a metallic housing. It is preferable that these housings are as compact as possible, not only so that they will be inconspicuous, but also for reasons of economy and safety. As a result, conventional load break disconnecting switches and fuses, which are designed for use and installations where space is not a particular problem, have been found unsatisfactory for use with underground systems.

Loadbreak disconnecting switches and fuses are mounted between upper and lower insulators with the upper insulator having a stationary contact jaw and the lower insulator supporting a hinge member. The distance between the upper stationary contact jaw and the lower hinge member is a standard distance in the industry. To avoid replacing the mounting to install a new loadbreak disconnecting device, it is preferred that the loadbreak disconnecting device have dimensions and features which allow it to be used with conventional insulator mountings.

U.S. Pat. No. 3,235,696 to Mikulecky discloses a typical prior art load break disconnecting device. The load break disconnecting device of Mikulecky is a nonconductive means mounted on an elongate switch means and is resiliently urged into covering relation of a conductive portion of the switch means relative to stationary contact means upon movement of the switch means away from the stationary contact means so that any arc struck therebetween will be extinguished. The nonconductive means is a sleeve concentrically mounted on the switch means for longitudinal movement toward a covering relation with respect to the conductive portion. The switch means includes a spring latch means for holding the nonconductive means away from the conductive portion and the stationary contact means includes a latch release means so that the nonconductive means is released upon movement of the switch means into and subsequently out of engagement with the stationary contact means. The load interrupting device cannot be closed until its interrupting structure is relatched. The conductive means may include a fuse having a fusible element wound around a support rod of an insulating material. Such fuses are of the gassing type which are shorter in length than non-gassing type fuses.

SUMMARY OF THE INVENTION

The present invention is an improved load break disconnecting device comprising a stationary contact, a switch having a conductive portion which can be moved into and out of contact with the stationary contact, a nonconducting sleeve which is moveable relative to the switch, a spring biasing the nonconducting sleeve toward a covering relation with the switch, a latch for holding the sleeve in a non-covering relation with the switch when the switch is not engaging the contact, and a bumper member which operates to disengage the latch and hold the sleeve in a non-covering position while the switch engages the contact. The elements of the device operate to rapidly move the sleeve into its covering position when the engaged switch is disengaged from the contact, allowing improved interruption of any arc which might be struck between the switch and the contact.

The present invention improves the interrupting capacity, operational speed, reliability, ease of installation, and reduces the cost of the load break interrupting device. Burn damage to contact areas is minimized by increased acceleration of the nonconductive sleeve, and the capacity of the device is increased by adapting the device to incorporate the longer, higher amp rated non-gassing type fuses without increasing the overall length of the device.

The present invention uses a non-gassing dual element fuse which is longer and is available in higher current ratings than previous gassing type fuses. The fuse includes a tubular body having a support structure disposed therewithin. The support structure has spaced-apart fuse element supporting surfaces. At least one fuse element is disposed about the support structure in contact with the supporting surfaces. The fuse element includes an array of reduced area portions which are non-randomly disposed about the support structure so as to be substantially free from contact with the supporting surfaces. The fuse element is spirally disposed about the support structure in a plurality of spaced-apart turns.

To install the longer non-gassing type fuse within the existing contacts, it is necessary to reduce the length of the prior art serially connected load break device while at the same time increasing the load break interrupting capacity to be consistent with the requirements of fuses rated up through 50 amps when used at voltages through 17.2 kv. The present invention achieves these improvements and provides the corresponding benefits, including increased reliability and reduced cost.

In addition to the increased capacity, the present invention provides improved arc extinction. Lighter moving parts, a higher spring force and improved design allow the nonconducting sleeve to snap more quickly into a covering position relative to the conductive portion of the switch, thereby minimizing the time during which arcing is possible. Reduced arcing gives reduced burning and erosion of the contacts and of the parts involved in the load breaking process.

Because it incorporates a longer higher amp rated non-gassing type fuse, and because of its improved arc-extinction, the load break disconnecting device of the present invention may be used on both higher voltage systems and systems having higher load current interrupting requirements. Because the switch and nonconductive sleeve are more compact, the higher capacity device can be used in existing mountings and enclosures without modifications.

Finally, in addition to having increased spring force, the compression spring which bears on the nonconductive sleeve is made conical to fit into the reduced space and yet gives higher forces over a greater distance, and provides self-centering to eliminate any possibility of the spring becoming entangled and interfering with the movement of the nonconductive sleeve. The conical spring telescopes into the reduced space and has an increasing spring rate as it is compressed, resulting in a higher initial force on the sleeve, which increases its initial acceleration when the device is opened.

These and other objects and advantages of the present invention will become apparent from the detailed description thereof taken with the accompanying drawings.

BRIEF DESCRIPTION OF THE DRAWINGS

For a detailed description of the preferred embodiment of the invention, reference will now be made to the accompanying drawings, wherein.

DESCRIPTION OF A PREFERRED EMBODIMENT

Figure 1:
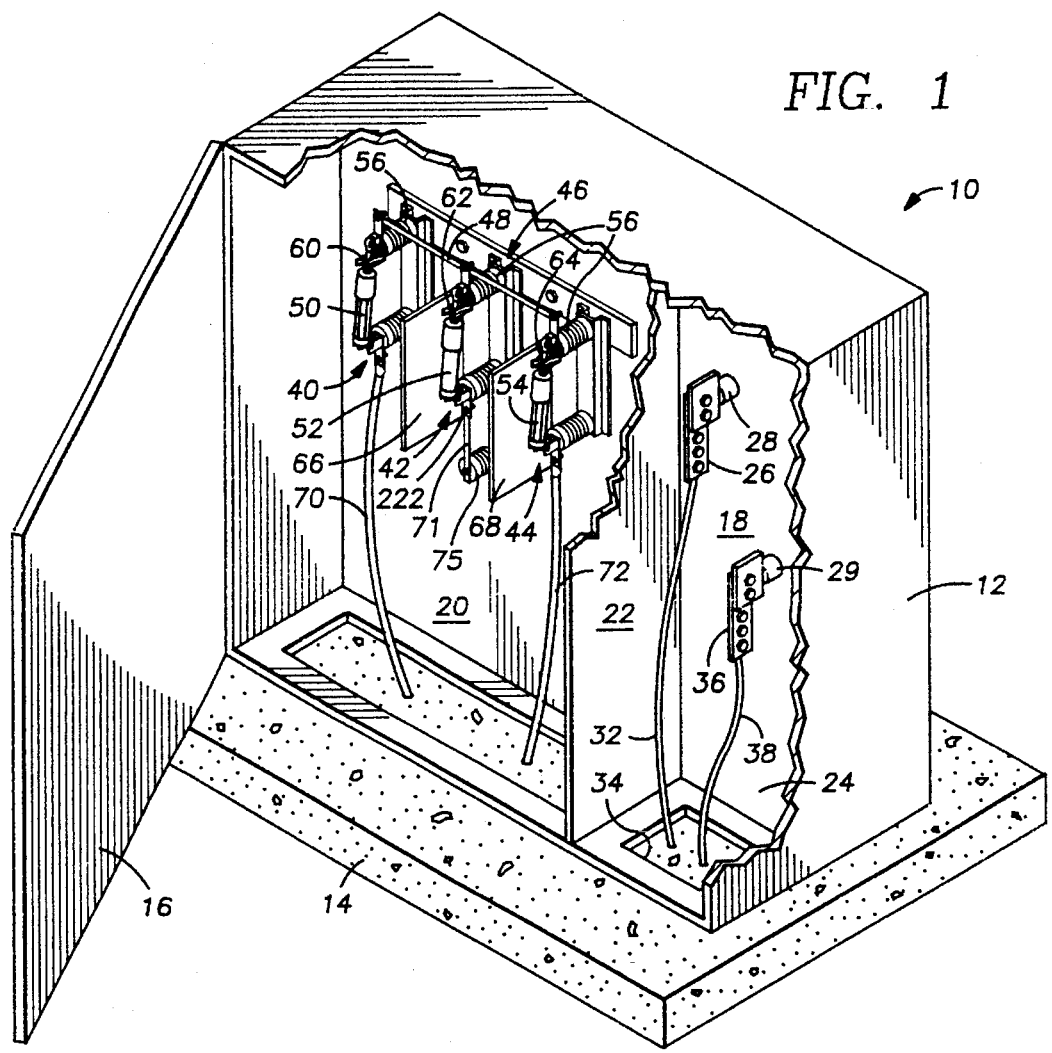
FIG. 1 shows a transformer enclosure which houses the load break disconnecting switch of the present invention.
Figure 2:
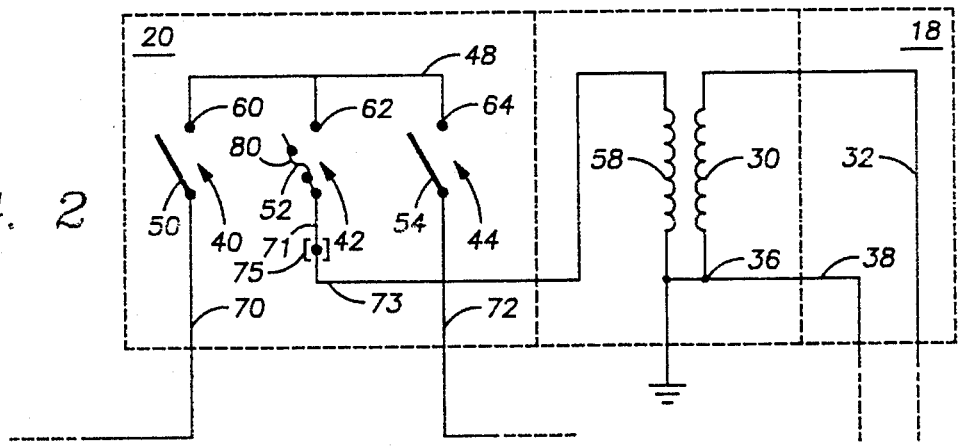
FIG. 2 schematically illustrates the transformer enclosure show in FIG. 1.

Referring initially to FIGS. 1 and 2, there is shown a ground-level transformer 10 which is mounted within a metallic enclosure 12 that is mounted on a concrete pad 14. The enclosure 12 is provided with an access door 16 for exposing a low voltage terminal bushing compartment 18 and a high voltage terminal bushing compartment 20 which also contains the load break interrupting switch. The compartments are separated from each other by an interior panel 22 and from the transformer compartment by an interior back panel 24. As will be understood by those skilled in the art, the various panel members forming compartments 18 and 20 may be composed of insulating material if the electrical clearance distance between the electrically energized parts is insufficient for the voltages being used.

The low voltage terminal compartment 18 as shown in FIGS. 1 and 2 include a first terminal 26 which is mounted on and insulated from the panel 24 by a bushing 28 and which connects one side of the transformer secondary winding 30 to a load conductor 32 extending downwardly through an aperture 34 in the bottom of compartment 18 and to the load circuits (not shown). Compartment 18 also includes a ground terminal 36 affixed to panel 18 by means of a bushing 29 for connecting the other side of the secondary winding 30 to a ground conductor 38 to the underground system.

The high voltage compartment 20 shown in FIGS. 1 and 2 encloses three load break switches 40, 42, and 44 which are disposed in parallel side-by-side relation. Each of the load break switches 40, 42, and 44 includes an elongate conductive portion 50, 52, and 54, respectively, each of which is pivotally mounted at its lower end for movement into and out of engagement with a stationary contact assembly 46. The stationary contact assembly 46 includes a stationary contact jaw 60, 62, and 64 for each of the load break switches 40, 42, and 44, respectively. Each stationary contact jaw 60, 62 and 64 is electrically connected to a common bus 48. Stationary contact assembly 46 is supported on insulators 56 which are secured to back panel 24. The conductive portions 50, 52, and 54 of switches 40, 42, and 44 are different in that the central load break switch 42 includes a fuse 80, preferably of the non-gassing type shown in FIG. 5, as its conductive portion while the outer load break switches 40 and 44 have conducting portions 50 and 54 that comprise switch blades. The switch blades are hollow tubular members made of any suitable highly conductive material, such as copper.

Insulating panels 66 and 68 separate the central load break switch 42, with its conductive portion 52, from the outer load break switches 40 and 44. As seen in FIG. 2, one side of the transformer high voltage winding 58 is connected to the loadbreak switch 42 through conductor 73, high voltage bushing 75 and conductor 71. The other side of winding 58 is grounded. The switch blades of conductive portions 50 and 54 are respectively connected to conductors 70 and 72 which are connected to a loop energizing circuit which is not shown but which is understood by those skilled in the art to consist of a power distribution system wherein an energy source is disposed at each end of the system and power may flow in either direction. It can be seen, therefore, from FIG. 2, that by opening the load break switch 42, the transformer 10 may be isolated from the loop circuit or by opening the load break switches 40 or 44, the transformer 10 may be isolated from power flow in either direction.

Figure 3:
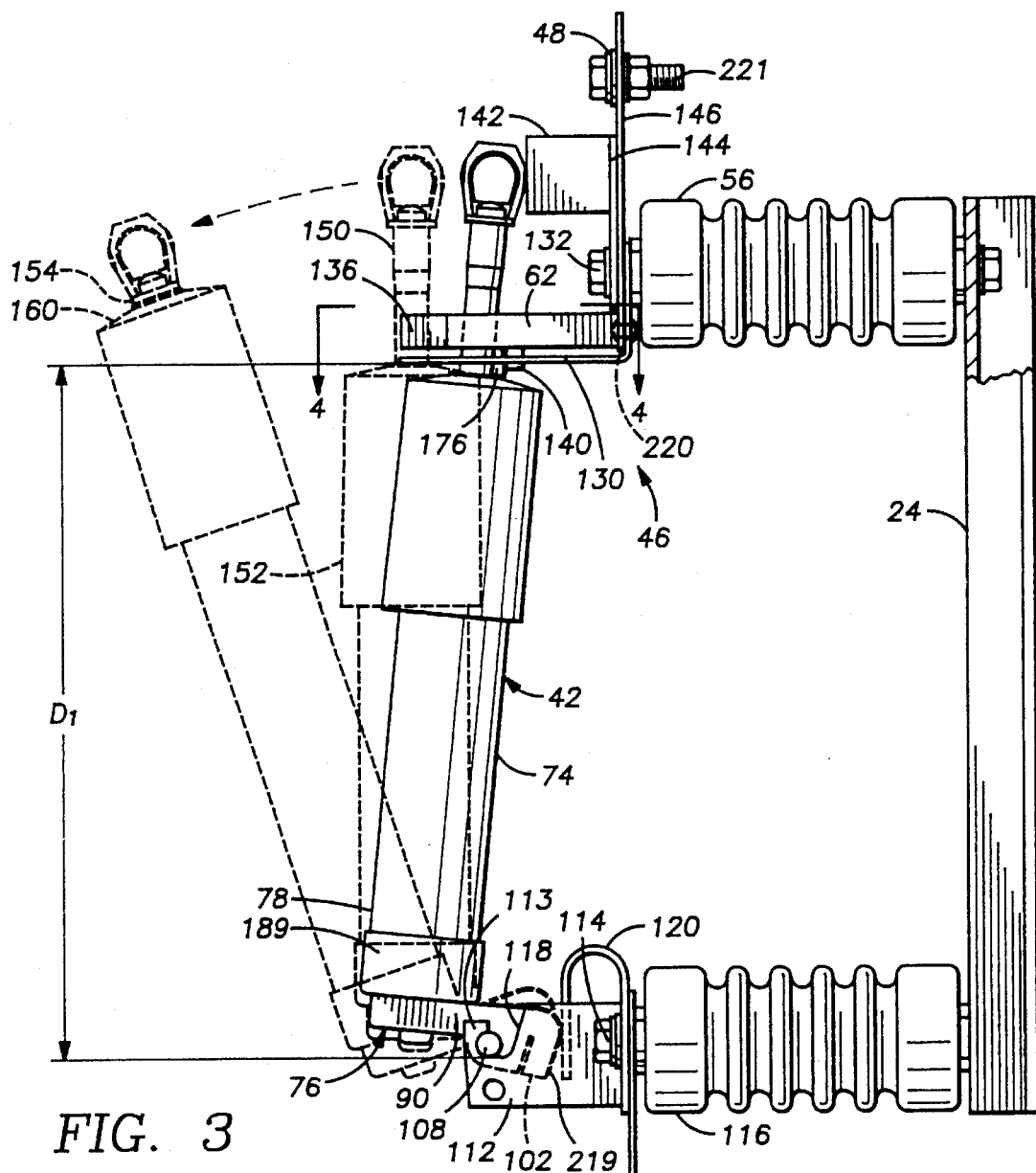
FIG. 3 is a side elevational view of the load break disconnecting device in accordance with the present invention.
Figures 5, 10:
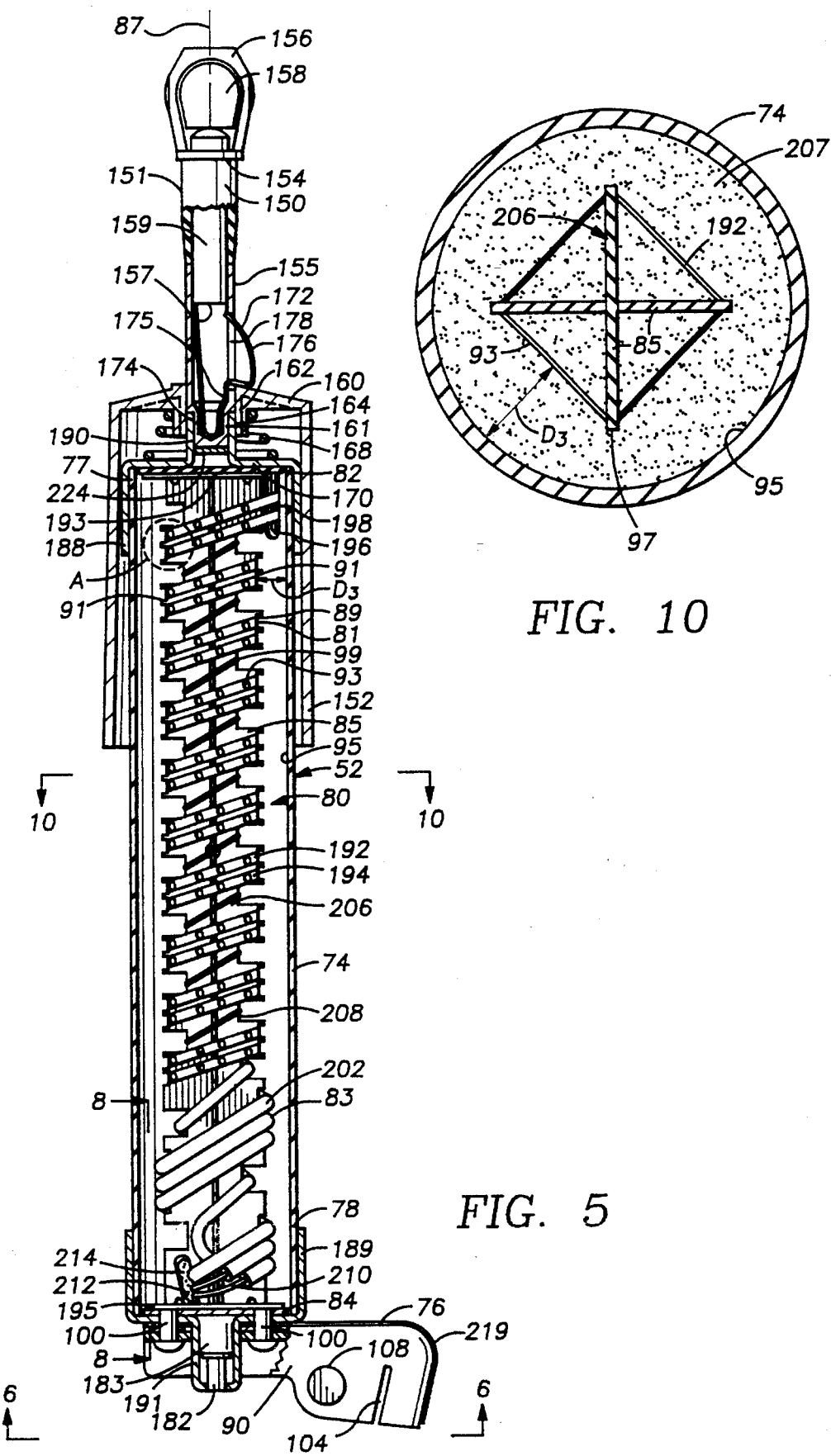
FIG. 5 is a side cross-sectional view in elevation of the device shown in FIG. 3 with the arc interrupting mechanism shown in detail.
FIG. 10 is a cross-sectional view at plane 10—10 of FIG. 5.

Referring now to FIGS. 3 and 5, the load break disconnecting device of the present invention includes a load break switch 42 having a conductive portion 52, an arc interrupting assembly with an upwardly spring biased nonconductive sleeve 152 which cooperates with a nonconductive plug 150, a hinge assembly which includes hinge 76 mounted on conductive portion 52 and hinge member 112 mounted on insulator 116, and stationary contact assembly 46 which engages contact tube 155 on conductive portion 52. In the closed position, the stationary contact assembly 46 electrically engages contact tube 155 of conductive portion 52 for conducting electrical current. Upon rotating switch 42 on the hinge assembly, any arc formed by the disengagement of stationary contact assembly 46 and contact tube 155 is extinguished by the upward movement of nonconductive sleeve 152.

The dimensions of conventional insulator mountings vary with the kv rating of the loadbreak disconnecting device. Typical kv ratings are 8.3 kv and 15.5 kv.

Stationary contact jaws 60, 62, 64 and hinge member 112 shown in the Figures are conventional. Typically, stationary contact jaws 60, 62, 64 are separated from their respective hinge member 112 by a standard distance $D_I$. The distance $D_1$ for an 8.3 kv mounting is $9^{15}/_{16}$ inches and $14^{5}/_{16}$ inches for a 15.5 kv mounting. The loadbreak disconnecting device of the present invention is sized to be mounted in an insulator mounting with standard dimensions. To fit in standard insulator mountings, the length of fuse body 74 is 7.97 inches for an 8.3 kv fuse and 12.31 inches for a 15.5 kv fuse.

Referring now to FIG. 5, the conductive portion 52 of disconnect switch 42 is shown to comprise a hollow tubular member in the form of a cartridge 74 for housing a fuse 80. The cartridge 74 is a protective tube of insulating material, preferably an epoxy-enriched fiberglass, having its upper and lower ends 77, 78 enclosed by upper and lower end caps 188, 189, respectively. In the preferred embodiment, fuse cartridge 74 has an inner diameter of 1⅞ inches and an outer diameter of 2.0 inches. Although a two inch outside diameter cartridge is preferred as a standard dimension, the outer diameter of cartridge 74 may be increased as for example to 2.7 inches and still be installed in a conventional insulator mounting. Caps 188 and 189 are made of a conducting material, such as copper. Each of the end caps 188,189 are sized to sliding receive the ends 77, 78 of cartridge 74 and are affixed to cartridge 74 by epoxy. End caps 188, 189 completely close the ends 77, 78 of cartridge 74. Each of the end caps 188, 189 includes a central cylindrical portion 190, 191, respectively, which projects outwardly from the ends 77, 78 of cartridge 74.

Fuse 80 is a non-gassing, current limiting type fuse and includes a high current fusible element 81 and a low current fusible element 83 which are housed in cartridge 74. High current fusible element 81 includes two element ribbons 192, 194. Fuse cartridge 74 houses a supporting structure known as a spider support 206 which supports fusible elements 81 and 83. High purity silica sand 207 (See FIG. 10) or other materials having suitable interrupting and insulation characteristics surrounds spider support 206 and fusible elements 81 and 83 and fills the unused volume within fuse cartridge 74. Element terminations 193,195 are attached to each end of spider support 206. Element terminations 193,195 include tangs 196,212 extending inwardly of cartridge 74. The upper end of element ribbons 192,194 of high current fusible element 81 terminate at upper tang 196 and are soldered to tang 196 at 198. A mica insulator 82 is provided between end cap 188 and the upper element termination 193.

Figure 8:
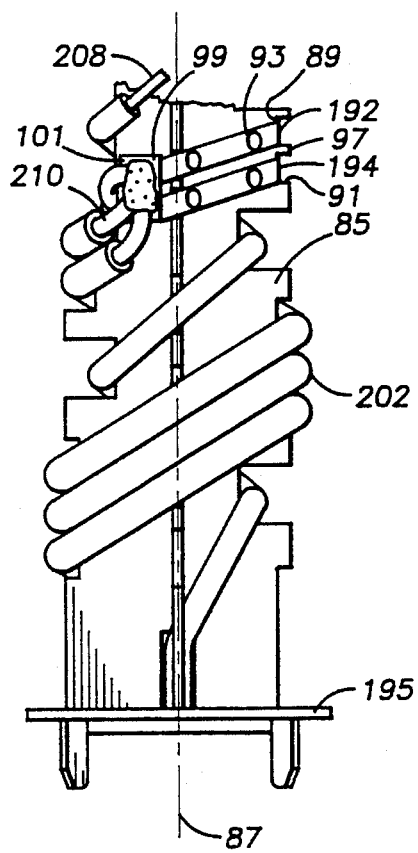
FIG. 8 is an enlarged view of the elevation view at plane 8—8 in FIG. 5.

Referring now to FIGS. 5, 8, and 10, spider support 206 is made of an inorganic mica in the preferred embodiment. It includes four arms 85 radiating from the longitudinal axis 87 of fuse 80, three of arms 85 being visible in the Figures. Opposing arms 85 are constructed of planar sections which are joined in a perpendicular relationship. The first planar section is inserted through a central slot in the second planar section and then rotated 90° until shoulder extensions on the first planar section engage slots in the second planar section to form an interlocked, X-shaped spider support 206. Each arm 85 is castellated along its longitudinal length by alternating notches 83 and element support surfaces 89 evenly spaced along each arm 85. The element ribbons 192,194 of high current fusible element 81 are disposed on element support surfaces 89. In the preferred embodiment, each element support surface 89 includes a pair of recesses 91 for receiving and supporting each of the element ribbons 192, 194 of high current fusible element 81. Tangs 97 form recesses 91. The longitudinal length of each element support surface 89 is preferably approximately 0.562 inches wide for both the 8.3 and 15.5 kv rated fuse. Outer tangs 97 are preferably approximately 0.047 inches wide with medial tang 97 being preferably approximately 0.062 inches wide. Tangs 97 form a pair of recesses 91 having a depth preferably 0.062 inches for receiving and supporting the ribbons 192,194 of high current fusible element 81. The top of each tang 97 is located approximately 0.312 inches from the bottom of notch 99. The bottoms of opposite recesses 91 on a planar section of opposed arms 85 are approximately 1.305 inches apart such that they are approximately 0.285 inches from the interior circumferential wall 95 of fuse cartridge 74. Adjacent element support surfaces 89 on an arm 85 are spaced apart a distance equal to the width of notch 99, i.e. 0.418 inches. Additionally, each element support surface 89 is offset from an element support surface 89 of the diametrically opposed arm 85. In this fashion shown in FIG. 5, element support surfaces 89 are disposed along the length of support spider 206 such that high current fusible element 81 is wound about spider support 206 in a spiral or helical fashion to form windings or turns having a radius of approximately 0.65 inches as measured from fuse axis 87 to the bottom of recess 91. The pitch of the windings of high current fusible element 81 is preferably 0.980 inches, which means that each complete turn of the fusible element 81 requires 0.98 inches of spider support length.

In the preferred embodiment, high current fusible element 81 comprises one or more lengths of ribbon, wire or serially connected ribbon and wire. A pair of element ribbons 192, 194 are shown in the Figures. Element ribbons 192,194 are preferably silver having a melting temperature greater than 900° C. and preferably a melting temperature of approximately 960° C. Other electrically conducting material may be employed. Each ribbon 192, 194 has a width of preferably approximately 3/16 inches and a thickness of in the range of approximately 0.002 to 0.007 inches depending on the current rating of the fuse. The length of ribbons 192, 194 is dependent upon the voltage rating of fuse 80. For example, for an 8.3 kv rated fuse, ribbons 192, 194 will preferably have a length approximately 21 inches. For a 15.5 kv rated fuse, ribbons 192, 194 will preferably have a length of 36 inches. With the silver ribbons 192, 194 described above and having a length suitable for a 15.5 kv application, each ribbon 192,194 will preferably include 9 turns, the ribbon edges of each of which should preferably be spaced apart from adjacent turns by 0.512 inches for two parallel 0.188 inch wide ribbons and 0.703 inches for a single 0.188 inch wide ribbon when measured parallel to the axis 87 of the fuse 80. A turn-to-turn separation that is too small may allow flash over between turns and cause the fuse to fail, while a turn-to-turn spacing larger than necessary will result in a fuse that is too long to be employed in a conventional insulator mounting. Similarly, for the 8.3 kv rated fuse 80, ribbons 192, 194 will preferably include 5.25 turns along the length of spider support 206. In this example, the turn-to-turn spacing should be the same as the 15.5 kv fuse, again as measured from ribbon edge to ribbon edge parallel to fuse axis 87. A ¼ turn of ribbons 192, 194 requires a one inch length of ribbons 192,194. One full turn of ribbons 192, 194 requires a four inch length of ribbons 192, 194. To increase the length and/or number of ribbons in high current fusible element 81 and thereby increase the fuse's voltage and/or current rating, the diameter of cartridge 74 may be increased to allow the spider support 206 to be enlarged thus allowing for additional ribbons or a longer length of ribbon to be housed within the fuse.

The ribbon element of each of the ribbons 192,194 includes an array of reduced area portions 93 which, in the preferred embodiment, comprise holes that are formed through the thickness of the ribbon element. As an alternative to holes, notches may be formed along the edges of the ribbon element. Reduced area portions 93 are formed in ribbons 192, 194 at locations such that when ribbons 192, 194 are wound about spider support 206, reduced area portions 93 do not contact element support surfaces 89 of spider arms 85. Instead, reduced area portions 93 are positioned between spider arms 85 and do not lie over the element support surfaces 89. In the preferred embodiment, reduced area portions 93 are spaced apart 0.500 inches, centerline to centerline, and are positioned such that the element support surfaces 89 of spider support 206 supports ribbons 192,194 only at points substantially halfway between adjacent reduced area portions 93. In this fashion, as shown in FIG. 5, the reduced area portion 93 of adjacent ribbon sections are generally aligned in columns that are substantially parallel to fuse axis 87, and may be staggered relative to the reduced area portions in adjacent elements when viewed perpendicular to the elements or across the shortest element-to-element spacing. Reduced area portion 93 has a distance $D_3$ from the interior circumferential wall 95 of fuse body 74 between 0.238 and 0.300 inches.

There are significant advantages to maintaining a separation between reduced area portions 93 and element support surfaces 89 of spider arms 85 which allow for construction of current limiting fuses significantly smaller than those presently known and which permit fuse 80 of the present invention to fit within existing insulator mountings.

In general, arcing along the path of a high current fusible element 81 begins at the element's reduced area portions 93. This results in the development of larger and hotter fulgurite portions (the molten sand structure that develops during a fuse operation) at these reduced area portions. With most common element winding shapes (rectangular, hexagonal, etc.), the element-to-tube clearance varies along the winding. If the hotter and larger fulgurite producing reduced area portions 93 of the element 81 are positioned in segments of the winding having greater element-to-tube clearance, or are kept at the maximum achievable distance away from the outermost radial dimensions of the element winding 81—that is, as far removed as possible from the outer most projecting element support surfaces 89 of spider support 206—the element 81 can be wound with a larger radius and still fit within a given diameter of fuse cartridge 74 without resulting in thermal damage to the tubular fuse body 74 which might otherwise occur and lead to failure of the fuse during a fault current interruption.

Further, although the materials typically employed as spiders are generally thought of as being relatively "inert" with respect to arcing during a current interrupting process, it has been found that the increased arc time across the element support surfaces 89, which results from positioning a reduced area portion 93 on a spider support surface, tends to degrade the fuse's interrupting performance by allowing higher let through $I^2t$, which contributes to larger fulgurite size. Further, the fulgurite tends to be larger at points where the element 81 contacts the element support surface 89, as compared to points where like sections of element 81 are completely surrounded by sand. In addition, when the reduced area portions 93 are positioned as shown and described in FIG. 5, the maximum width sections of fulgurite that form at the element's reduced area sections 93 are staggered or offset from the widest fulgurite sections in the adjacent turns of element 81 to provide maximum separation between adjacent turns of fulgurite.

In the present invention, positioning the reduced area portions 93 of element 81 away from the spider support surfaces 89 allows for the required element length of a ribbon element fuse to be achieved in the diameter and length constraints that are defined by a conventional insulator mounting. Positioning the reduced area portions 93 away from the spider support surfaces 89 allows for a maximum winding diameter, or maximum achievable length of element per turn, by keeping the portions of the element 81 that will develop the largest and hottest fulgurite away from the winding segments having minimum element-to-tube clearance. Likewise, the development of smaller fulgurites and also the stagger in the widest sections of adjacent turns of these smaller fulgurites allows the elements 81 to be wound more closely together, and allows for more turns of element 81 in a given length of fuse cartridge 74, without risking turn-to-turn short circuits, by minimizing the encroachment of the fulgurite in the spacing that separates adjacent turns of element.

Referring still to FIGS. 5 and 8, connected in series with high current fusible element 81 is low current fusible element 83 which may include 1, 2 or 3 parallel connected low circuit elements 210. The series connector between fusible elements 81 and 83 is formed by copper conducting strap 101. Conducting strap 101 is supported on spider support 206. Low current fusible element 83 is designed to operate at a predetermined current level below that which high current fusible element 81 is designed to operate. In the preferred embodiment, fusible element 83 comprises a pair of conducting wires 210, electrically in parallel, which are preferably formed of silver or other good electrically conductive material and insulated in silicon rubber tubes 202. The covered wires 210 are then helically wrapped about the lower section of spider support 206. One end of each of the wires 210 is attached to conducting strap 101 at termination point 99 by soldering. In a 15.5 kv rated fuse, termination point 99 is 2.60 inches from the lower end of fuse cartridge 74. The other ends of wires 210 are conductively attached to lower tang 212 of lower element termination 195 by solder 214. Before installation, each of the wires 210 are comprised of two approximately equal lengths of wire that are soldered together at a junction with a solder having a substantially lower melting temperature than that of wire 210. The solder used at the junction has thermal characteristics causing it to melt at a temperature consistent with the time current characteristic requirements of the fuse.

Figure 7:
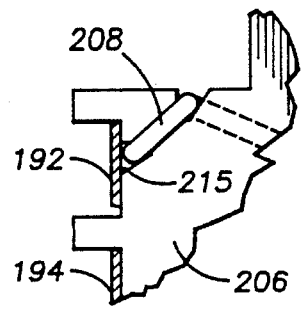
FIG. 7 is an enlargement of detail A shown in FIG. 5.
Figure 9:
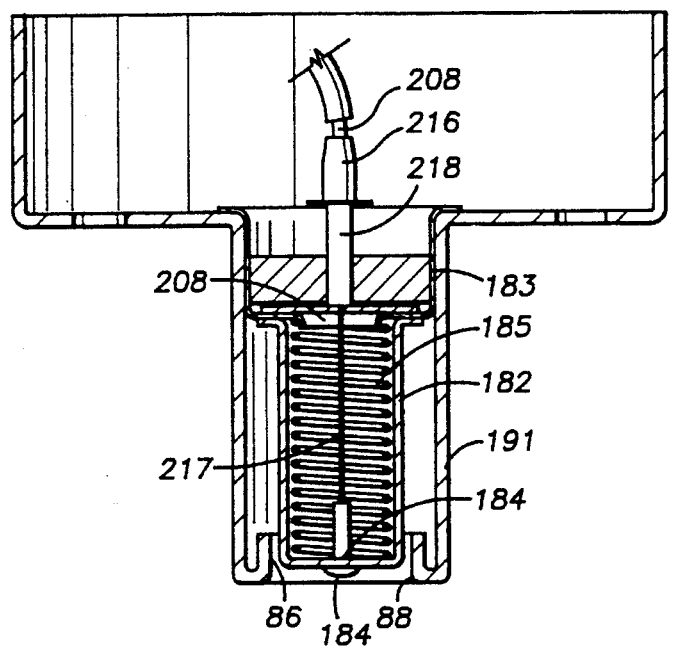
FIG. 9 is an enlarged cross-sectional view of the blown fuse indicator of the switch of the present invention.

Referring now to FIG. 9 and the lower end of cartridge 74, a blown fuse indicator 182 is disposed within the cylindrical portion 191 of lower end cap 189. An indicator trigger wire 208 is wound through the notches 99 of spider support 206 for the length of cartridge 74, parallel to but not in conductive contact with the element ribbons 192, 194. The lower segment of wire 208 is insulated in a silicon rubber covering as it enters the space occupied by low current fusible element 83. As shown in greater detail in FIG. 7, one end of the indicator trigger wire 208 is wrapped around the spider 206 support at a point under element ribbon 194 such that a small gap 215 is formed between element 194 and indicator trigger wire 208 at the upper end of the fuse.

Referring again to FIG. 9, the indicator trigger wire 208 terminates in conductive receptacle 216. One end of a blown fuse indicator retaining wire 217 is terminated in eyelet 218. The other end of the blown fuse indicator retaining wire 217 extends into blown fuse indicator 182 and is soldered to blown fuse indicator 182 at 184. Unlike indicator trigger wire 208, indicator retaining wire 217 is exposed to the atmosphere. Optionally, indicator retaining wire 217 may also have a high electrical resistance relative to indicator trigger wire 208. An indicator spring 185 urges the indicator 182 away from the fuse 80. During normal use, the indicator retaining wire 217 is in tension and serves to restrain the indicator 182 within the cylindrical portion 191 of the lower end cap 189 in the non-indicating position, against the bias of spring 185. When the fuse 80 operates, current arcs across gap 215 to indicator trigger wire 208 and flows through indicator trigger wire 208 and the serially connected blown fuse indicator retaining wire 217. This current flowing through the relatively high resistance indicator retaining wire 217 causes the retaining wire 217 to quickly melt.

When indicator retaining wire 217 melts, spring 185 is released and urges blown fuse indicator 182 through a central aperture 86 in the lower end of cylindrical portion 191. When extended in the indicating position, the indicator 182 extends beyond lower end cap 189 and is visible from the bottom of fuse 80.

Figure 6:
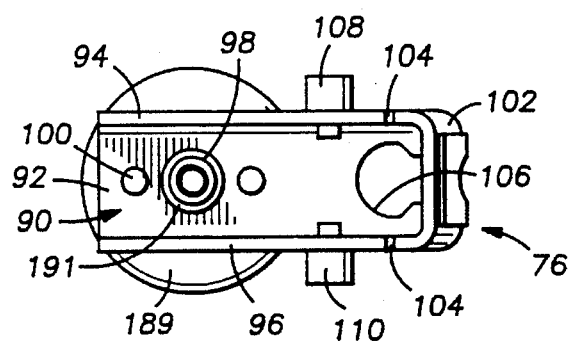
FIG. 6 is a view taken along lines 6—6 of FIG. 5.

Referring now to FIGS. 3, 5 and 6, hinge assembly 76 is mounted on the lower end 78 of cartridge 74 and lower end cap 189. Hinge assembly 76 includes a hinge 90 having a base 92 with downwardly projecting lateral sides 94, 96. One end of hinge 90 is affixed to lower end cap 189 by providing an aperture 98 in base 92 to receive cylindrical portion 191 of end cap 189 therethrough and by rivets 100 extending through base 92, shunt 219 and lower end cap 189. The other end 102 of hinge 90 projects from the lower end 78 of cartridge 74 and end cap 189 for pivotal attachment to mounting hinge 112, as hereinafter described with respect to FIG. 3. Lateral sides 94, 96 extend around the end 102 to provide a closure for end 102. End 102 is formed by cutting slots 104 in sides 94, 96 to allow the bending of end 102 to form the closure. A key shaped aperture 106 is also provided in end 102 to accept a standard hot stick. End 102 also includes a pair of hinge lugs 108, 110 extending laterally from sides 94, 96, respectively for pivotal attachment to mounting hinge 112. Hinge 90 is stamped from a material of any electrical conductivity. A projection of shunt 219 extends from between cap 189 and hinge base 92 to cover hinge end 102. Shunt 219 is made from a material having good electrical conductivity such as silver plated copper.

Referring particularly to FIG. 3, a generally U-shaped hinge member 112 is provided for cooperation with hinge 90 of hinge assembly 76 and is affixed by means of a bolt 114 to an insulator 116 which is mounted on the back panel 24 and which supports member 112 below the stationary contact assembly 46. Each of the arms 113 of the hinge member 112 have a pivot slot 118 for receiving the hinge lugs 108, 110 of hinge 90. When the switch 42 is rotated into its closed position as shown by full lines in FIG. 3, shunt 219 covering hinge end 102 of hinge 90 is forced into engagement with an inverted U-shaped resilient contact member 120. Contact member 120 is also secured to the insulator 116, together with a flat terminal bar 122, by bolt 114. Bolt 222 secures conductor 71 in conductive engagement with terminal bar 122.

Referring now to FIG. 5 and the upper end of cartridge 74, a contact tube 155 is attached to upper end cap 188. Contact tube 155 includes a reduced diameter portion 161 which is received by the bore of cylindrical portion 190 of upper end cap 188. Cylindrical portion 190 is crimped onto the reduced diameter portion 161 of contact tube 155. Contact tube 155 is made of a conductive material, such as copper. A gasket 224 is positioned within cylindrical portion 190 below reduced diameter portion 161 of contact tube 155 to seal the opening in cylindrical portion 190 before contact tube 155 is fastened in the opening. The major diameter of contact tube 155 has a diameter equal to the diameter of cylindrical portion 190 of upper end cap 188.

A nonconductive sleeve 152 is slidably mounted in a surrounding relation over the upper end 77 of cartridge 74. Nonconductive sleeve 152 is made of an insulating material having good arc extinguishing properties, such as Rosite 3250A and 3250C, Delrin, Celcon, or Teflon. Another favorable property exhibited by these materials is that they are nontracking, i.e., their degradation in the presence of an electrical arc does not leave conductive carbon deposits on their surfaces.

Nonconductive sleeve 152 includes an annular end closure portion 160 which extends inwardly from its upper end. Annular closure portion 160 includes a cylindrical re-entrance portion 162 which projects inwardly into the outer sleeve of nonconductive sleeve 152. The re-entrance portion 162 is cylindrical and has an inner cylindrical surface 164 which sliding receives contact tube 155 and upper cylindrical portion 190 of upper end cap 188. Re-entrance portion 162 provides a bearing for the telescopic sliding engagement between nonconductive sleeve 152 and cartridge 74.

A conical compression spring 168 is disposed in surrounding relationship to re-entrance portion 162 and cylindrical portion 190 of upper end cap 188. Compression spring 168 is disposed within nonconductive sleeve 152 and extends between the annular closure portion 160 of nonconductive sleeve 152 and the upper surface of upper end cap 188 of cartridge 74. When spring 168 is compressed between closure portion 160 of nonconductive sleeve 152 and the surface of upper end cap 188, spring 168 biases nonconductive sleeve 152 upwardly on cartridge 74. The compression spring 168 is conical so as to provide higher forces over a greater distance and also is self-centering to eliminate any possibility of becoming entangled and interfering with the sliding motion of the nonconductive sleeve 152.

As shown in FIG. 5, a latch spring 172 is disposed within the contact tube 155. Spring 172 has a generally U-shaped body portion 174 and a latch tip 176 which extends radially outwardly through a longitudinal slot 178 formed in contact tube 155 adjacent its lower end. The reduced diameter portion 161 of contact tube 155 includes a closed end bore for receiving the U-shaped end of spring 172. The closed end bore of contact tube 155 has a conical bottom for centering the U-shaped end of spring 172 within contact tube 155. The latch tip 176 of spring 172 includes a flared portion 175 which conforms to the interior of contact tube 155.

A nonconductive plug 150 is affixed to the upper end of contact tube 155. Plug 150 is made of a nonconductive material similar to that of nonconductive sleeve 152. Plug 150 includes a tube 151 having a pull ring 156 integrally mounted at its upper end. A stop flange 154 is also formed at the upper end of tube 151 adjacent to pull ring 156. A stem 159 is embedded within the tube 151 and projects outwardly therefrom. The projecting portion of stem 159 is received within the upper end of contact tube 155 and also forms a stop surface at 157 for one end of spring 172. Stem 159 provides mechanical strength to the connection of plug 150 to contact tube 155 as well as to the pull ring 156. The contact tube 155 is crimped onto the stem 159 of plug 150. The lower end of tube 151 includes a slight taper down to the diameter of contact tube 155.

Figure 4:
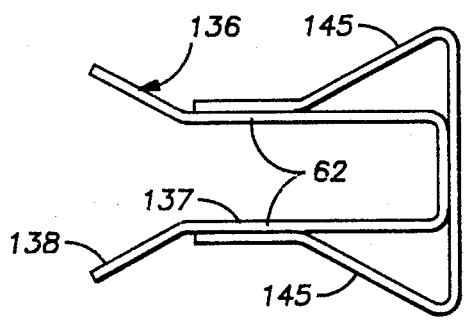
FIG. 4 is a view taken along lines 4—4 of FIG. 3.

Referring now to FIGS. 3 and 4, the stationary contact assembly 46 includes a resilient U-shaped conductive member 136 having good electrical conductivity. Contact jaw 62 formed by conducting member 136 provides a pair of opposed contact fingers 137, each of which has an outwardly flared end portion 138 for guiding the contact tube 155 of switch 42 into its engaged position. A substantially U-shaped back up spring member 145 is disposed adjacent to U-shaped member 136 to provide the requisite contact pressure. Conducting member 136, spring member 145 and terminal bar 146 are mounted to guard member 130 by rivet 220. Rivet 220 is made from a good electrically conducting material such as copper. Rivet 220 electrically connects conducting member 136 to terminal bar 146.

Guard member 130 is generally L-shaped in cross-section and supports an elongate bumper member 140 on its edge facing the contact tube 155. The purpose of the bumper member 140, which may be composed of rubber or the like, is to engage the latch tip 176 of spring 172 as contact tube 155 snaps into position between fingers 137 of conducting member 136 upon movement toward its closed position. An upper bumper 142 is supported by member 144 to engage the upper end of switch 42. Contact guard member 130 with attached conducting member 136, spring member 145, and terminal bar 146 along with upper bumper support member 144 are mounted on insulator 56 by bolt 132. Bolt 221 supports conductive engagement of terminal bar 146 with bus 48 shown in FIG. 2.

As seen in FIG. 3, when the switch 42 is in its closed position, the contact fingers 136 engage the contact tube 155 at a point immediately below its juncture with the nonconducting plug 150.

When the nonconductive sleeve 152 has been latched and prior to engagement between the contact tube 155 and the contact fingers 136, the nonconductive sleeve 152 and the latch spring 172 are in their position shown by the full lines in FIG. 3. As switch 42 is pivoted toward engagement with the stationary contact assembly 46 and as the contact tube 155 snaps into engagement with contact fingers 136, the bumper 140 will engage the latch tip 176 of the spring 172, forcing the latch tip 176 into the interior of upper tube 155. This allows the nonconductive sleeve 152 to move upwardly a slight distance until it engages and is restrained by the underside of bumper 140. The re-entrance surface 164 thus moves over the lower edge of the latch tip 176 so that upon subsequent movement of the cartridge 74, when nonconductive sleeve 152 comes out of engagement with the bumper 140, the latch tip 176 will be prevented from relatching the nonconductive sleeve 152.

When the load break switch 42 is in its closed position, current flow is from bus 48 through terminal bar 146, rivet 220, contact fingers 136, contact tube 155, fuse portion 80, shunt 219, the spring contact 120, to the terminal member 122. The current then flows through conductor 71 and high voltage bushing 75 to transformer conductor 73.

When it is desired to interrupt load current, a suitable tool is engaged with the eye 158 of pull ring 156 and the switch 42 is rotated in a counter-clockwise direction as viewed in FIG. 3. As the upper closure portion 160 of nonconductive sleeve 152 moves out of engagement with the bumper 140, nonconductive sleeve 152 will be moved upwardly by the spring 168 until its upper closure portion 160 engages the under side of contact guard 130 as seen by phantom lines in FIG. 3. Further counter-clockwise movement of the switch 42 will disengage upper contact tube 155 from contact fingers 136 whereupon an arc will be struck therebetween. Continued pivotal movement will then disengage the nonconductive sleeve 152 from the lower edge of contact guard 130 whereupon it will be snapped upwardly by the spring 168 until its upper closure portion 160 engages the flange 154, also as shown, by phantom lines in FIG. 3. As the cylindrical re-entrance portion 162 of nonconductive sleeve 152 moves upwardly over contact tube 155 and non conductive plug 150 the arc existing between the contact fingers 136 and contact tube 155 will be confined to the annular space between cylindrical re-entrance portion 162 and nonconductive plug 150. The arc in contact with the surfaces of re-entrance portion 162 and nonconductive plug 150 results in gases being released from the material of these parts. These gases assist in the rapid extinction of the arc. This rapid extinction of the arc ensures that there is a minimum of burn damage to both the conducting surfaces of contact tube 155 and contact fingers 136 and the arc extinguishing surfaces of the nonconductive sleeve 152 and the nonconductive plug 150.

Resetting of the nonconductive sleeve 152 is accomplished by physically moving the nonconductive sleeve 152 downwardly on cartridge 74 until its upper closure portion 160 moves below the latch tip 176 of spring latch 172 whereupon the latch tip 176 will snap outwardly through slot 178 to hold the nonconductive sleeve 152 against movement toward plug 150 under the influence of spring 168. It will be appreciated that if an attempt is made to move the switch 42 into its closed position without first resetting the nonconductive sleeve 152, the latter will engage the contact fingers 136 and because this diameter is substantially greater than that of contact tube 155, it can not be forced between the contact fingers 136 and accordingly movement of the switch 42 into a closed position is prevented. Further, because the contact tube 155 will be completely enclosed, prior to the latching down of the nonconductive sleeve 152, electrical engagement between the contact tube 155 and the contact fingers 136 will be impossible. Thus nonconductive sleeve 152 prevents closure of the switch 42 without first resetting the same, and this is accomplished without complicated interlocking structure.

The disconnect switches 40 and 44 are identical to the switch 42 except that the conductive portions 50 and 54 are switch blades which replace fuse 80 in conducting portion 52 of switch 42.

The present invention is an improvement over the state of the art. The non-gassing fuse 80 has replaced the typical prior art gassing type fuse for use in a conventional insulator mounting. The re-entrance portion 162 of nonconductive sleeve 152 is shortened to allow the use of the longer fuse 80. Further, the nonconductive sleeve 152 has been lightened in non-critical insulation areas to increase acceleration, thus reducing burn damage to contacts 136, contact tube 155, nonconductive sleeve 152, and plug 150.

Other improvements relate to the latch spring 172. The latch spring 172 provides a higher spring force and an increased latching angle. The increased spring force and increased latching angle are needed to improve retention of nonconductive sleeve 152 when operating against the higher forces provided by compression spring 168.

While the interrupting device according to the present invention has been shown with respect to one type of disconnecting switch or fuse and while it has been shown with respect to a housed transformer, it is not intended that the invention be limited thereby, but only by the scope of the appended claims.

We claim:

1. An improved load break disconnecting device for use in a switch mounting having spaced apart stationary and hinged conductors, the device comprising:

a conductive portion having a current limiting fuse for conducting a predetermined range of current;

a fuse cartridge having first and second ends and enclosing said fuse;

first and second end caps affixed to and enclosing said first and second ends, respectively, of said fuse cartridge and each including a cylindrical portion projecting outwardly from its center, said cylindrical portions each having an outer diameter;

a conducting hinge assembly affixed to said second cap for pivotally mounting said conductive portion on the hinged conductor;

a contact tube having one end affixed to a nonconducting plug and pull ring and having a second end connected to said cylindrical portion of said first cap, and having conductive engagement with the stationary conductor;

a nonconducting sleeve concentrically slidingly positioned over said first end of said fuse cartridge and said first cap, said sleeve having a closure portion at its first end and a cylindrical reentry portion extending into said sleeve from said closure portion, said reentry portion having an inner diameter sized to sequentially slidingly engage said outer diameters of said first cylindrical portion of said first cap, said contact tube, and said plug;

a coil spring disposed between said first cap and said closure portion and centered on said reentry portion for biasing said sleeve toward said plug;

a latch means mounted within said contact tube and positioned to hold said nonconductive sleeve in a latched position below said contact tube until it is unlatched by engagement with the stationary conductor, whereupon said coil spring urges said nonconductive sleeve upward until said nonconductive sleeve engages the stationary conductor, so that disengagement of the contact tube from the stationary conductor allows said spring to urge said nonconductive sleeve upward into engagement with said plug, thereby confirming and extinguishing any arc between the stationary conductor and said conductive portion.

2. The load break device of claim 1, wherein said fuse is a full range type fuse.

3. The load break device of claim 1, wherein said fuse includes a high fault current interrupting assembly and a low fault current interrupting assembly.

4. The load break device of claim 1, wherein said coil spring is conical shaped and extends to at least 2 times its compressed length during operation of the device.

5. The load break device of claim 1, wherein said fuse includes a blown fuse indicator affixed to said second end of said fuse and an indicator wire which allows said blown fuse indicator to drop through an opening in said cylindrical portion of said second end cap and become visible below the hinged conductor when said fuse has operated.

6. The load break device of claim 1, wherein said end caps are epoxied to said ends of said fuse and serve to prevent the ingress of moisture into said fuse cartridge.

7. The load break device of claim 1, wherein said latch means includes a latch spring having a latch portion extending through a longitudinal slot in said contact tube for engagement with the stationary conductor.

8. The load break device of claim 1, wherein said second end of said contact tube includes a bore in which said latch spring is housed within said contact tube.

9. The load break device of claim 1, wherein said plug and said sleeve are made of nonconducting plastic.

10. The load break device of claim 1, wherein said pull ring is integrally formed with said plug.

11. The load break device of claim 1, wherein said plug and said contact tube have one outer diameter at their point of connection, said diameter of said plug tapering to a slightly increased diameter at a point between said contact tube and said ring.

12. The load break device of claim 1, wherein a stem is embedded in said plug and extends into said contact tube.

13. The load break device of claim 1, wherein mica insulators are positioned between said first cap and said fuse.

14. An improved load break disconnecting device for use in an industry-standard switch mounting comprising:

a fuse body comprising an insulative fuse tube and a current limiting fuse element in said fuse tube, said fuse element comprising a first fusible element disposed within said fuse tube and adapted to actuate in response to current flow of a first predetermined magnitude, and a second fusible element disposed within said fuse tube and electrically in series with said first fusible element and adapted to actuate in response to a current flow of a second predetermined magnitude;

said fuse body being pivotally mounted at one end on a conductive hinge, said second fusible element being in electrical engagement with said conductive hinge;

a stationary contact jaw for conductive engagement with a second end of said fuse body, said first fusible element being in electrical engagement with said stationary contact jaw;

an arc extinguishing means mounted on said such that when said first fusible element is disengaged from said contact jaw resulting in an electrical current arc therebetween, said arc extinguishing means moves to a covering position with respect to said first fusible element, thereby extinguishing said arc.

15. The improved load break disconnecting device of claim 14 wherein said fuse has a rating of at least 17.2 kv and at least 50 amps.

16. The improved load break disconnecting device of claim 14 wherein said fuse comprises:

a support structure disposed within said body and having spaced-apart fuse element supporting surfaces;

said first fusible element disposed about said support structure in contact with said supporting surfaces and having an array of reduced area portions; and said reduced area portions of said array being nonrandomly disposed about said support structure so as to be substantially free from contact with said supporting surfaces.

17. The improved load break disconnecting device of claim 16 wherein:

said first fusible element is spirally disposed about said support structure in a plurality of spaced-apart turns; and said reduced area portions in said turns of said first fusible element are aligned in columns.

18. The improved load break disconnecting device of claim 17 wherein said reduced area portions in adjacent turns of said fuse element are offset.

19. The improved load break disconnecting device of claim 14 wherein said fuse comprises:

a spider disposed within said body and having spaced-apart supporting arms with a valley between said arms; and said first fusible element disposed on said spider in contact with said supporting arms, said first fusible element including a segment disposed between two of said supporting arms and wherein said segment is recessed into said valley between said arms.

20. The improved load break disconnecting device of claim 14 wherein said fuse comprises:

said insulative fuse body having first and second conductive end caps and a longitudinal axis;

a non-conductive support disposed longitudinally within said body and extending between said first and second conductive end caps, said non-conductive support having a plurality of support surfaces projecting radially from said longitudinal axis;

said first fusible element including a length of fuse element having a plurality of spaced-apart reduced area portions along said length; and said length of said fuse element being wound along said non-conductive support and engaging said support surfaces between adjacent reduced area portions.

* * * * *